United States Patent [19]
Fischer

[11] 3,902,343

[45] Sept. 2, 1975

[54] HERBICIDE MIXTURES OF 3-LOWER ALKYL-2,1,3-BENZOTHIADIAZINONE-(4)-2,2-DIOXIDE AND A SUBSTITUTED BENZOIC ACID DERIVATIVE

[75] Inventor: Adolf Fischer, Mutterstadt, Germany

[73] Assignee: BASF Aktiengesellschaft, Ludwigshafen (Rhine), Germany

[22] Filed: Jan. 11, 1974

[21] Appl. No.: 432,674

Related U.S. Application Data

[62] Division of Ser. No. 343,629, March 22, 1973.

[30] Foreign Application Priority Data

Apr. 13, 1972   Germany............................ 2217722

[52] U.S. Cl. ........................ 71/91; 71/90; 71/111; 71/114; 71/115; 71/121; 71/124
[51] Int. Cl.² ..................... A01N 9/12; A01N 9/24
[58] Field of Search................................ 71/91, 115

[56] References Cited
UNITED STATES PATENTS

| | | | |
|---|---|---|---|
| 3,174,842 | 3/1965 | McLane et al......................... | 71/115 |
| 3,391,185 | 7/1968 | Goebel.................................. | 71/115 |
| 3,708,277 | 1/1973 | Zeidler et al. ........................ | 71/91 |

OTHER PUBLICATIONS

Fischer I, "Herbicidal Compositions Containing etc.," (1971), CA 75, No. 75217h, (1971).

Fischer II, "Herbicidal Compositions," (1971), CA 74, No. 110,714w, (1971).

*Primary Examiner*—Glennon H. Hollrah
*Attorney, Agent, or Firm*—Johnston, Keil, Thompson & Shurtleff

[57] ABSTRACT

Herbicide compositions of mixtures in the weight ratio of 5:1 to 1:5 of (a) 3-lower alkyl-2,1,3-benzothiadiazinone-(4)-2,2-dioxide and (b) a compound of the formula

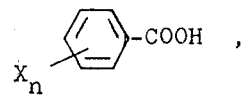

where X denotes halogen, methoxy or amino and $n$ denotes one of the integers 1, 2, 3 and 4, it being possible for methoxy and halogen or amino and halogen or methoxy, amino and halogen to be present simultaneously.

5 Claims, No Drawings

HERBICIDE MIXTURES OF 3-LOWER ALKYL-2,1,3-BENZOTHIADIAZINONE-(4)-2,2-DIOXIDE AND A SUBSTITUTED BENZOIC ACID DERIVATIVE

RELATED APPLICATION

This application is a division of my copending application Ser. No. 343,629, filed Mar. 22, 1973, the disclosure of which is incorporated herein by reference.

The present invention relates to a herbicide comprising a composition of several active ingredients.

It is known that substituted phenyl ethers, carbamates, terephthalates, acid amides, benzoic acids, fluorenecarboxylic acids and benzothiadiazinones have a herbicidal action. However, this action is poor.

I have now found that a composition of
a. a compound of the formula

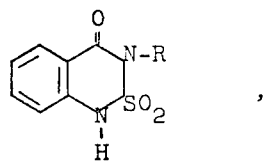

where R denotes lower alkyl of a maximum of 4 carbon atoms, or its salts, such as alkali metal, alkaline earth metal, ammonium, hydroxyalkylammonium, alkylammonium and hydrazine salts, e.g. salts with sodium, lithium, potassium, calcium, iron, methylammonium, trimethylammonium, ethylammonium, diethanolammonium, ethanolammonium, dimethylamine, dimethylethanolamine, hydrazine and phenylhydrazine, and
b. a compound of the formula

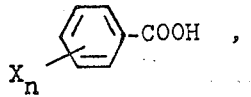

where X denotes halogen, methoxy or amino and $n$ denotes one of the integers 1, 2, 3 and 4, it being possible for methoxy and halogen or amino and halogen or methoxy, amino and halogen to be present simultaneously, have a herbicidal action superior to that of their individual components.

Active ingredients $a$ to $k$ may be applied in amounts of 0.5 to 5 kg per hectare.

The weight ratio of $a : b$, is from 5:1 to 1:5, preferably from 3:1 to 1:3.

The compositions of the invention are suitable for controlling unwanted plants, e.g. dicotyledonous seed weeds, monocotyledonous grassy seed weeds and Cyperaceae in crops such as cereals, rice, soybeans, Indian corn, potatoes, peas, and beans.

The compositions may be used pre- and/or postemergence.

The agents according to the invention may be used as solutions, emulsions, suspensions oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils.

The new compounds may be mixed with fertilizers, insecticides, fungacides and other herbicides.

EXAMPLE 1

The plants rice (*Oryza sativa*), soybeans (*Soja hispida*), Indian corn (*Zea mays*), wheat (*Triticum aestivum*), barnyard grass (*Echinochloa crus-galli*), giant foxtail (*Setaria faberii*), yellow nutsedge (*Cyperus esculentus*), common cocklebur (*Xanthium pensylvanicum*), wild mustard (*Sinapis arvensis*), waterplantain (*Alisma plantago-aquatica*), catchweed bedstraw (*Galium aparine*), chamomile (*Matricaria chamomilla*), slender foxtail (*Alopecurus myosuroides*) and annual bluegrass (*Poa annua*) were treated at a growth height of 4 to 20 cm with the following individual active ingredients and compositions thereof, each active ingredient and each composition being emulsified or dispersed in 500 liters of water per hectare:

I 2,4'-dinitro-4-trifluoromethyldiphenyl ether, 1.5 and 3 kg per hectare;
II 4'-nitro-2,4,6-trichlorodiphenyl ether, 2 and 3 kg per hectare;
III N-(1,1-dimethylpropynyl)-3,5-dichlorobenzamide, 1 and 3 kg per hectare;
IV 2-(2-methyl-4-chlorophenoxy)-N-methoxyacetamide, 1 and 2 kg per hectare;
V 2,3,6-trichlorobenzoic acid, 0.5 and 2 kg per hectare;
VI 2-methoxy-3,6-dichlorobenzoic acid, 1.5 and 2 kg per hectare;
VII 3-isopropyl-2,1,3-benzthiadiazinone-(4)-2,2-dioxide, 0.5, 1, 1.5, 2 and 3 kg per hectare;
I + VII: 1.5 + 1.5 kg per hectare;
II + VII: 2 + 1 kg per hectare;
III + VII: 1 + 2 kg per hectare;
IV + VII: 1 + 1 kg per hectare;
V + VII: 0.5 + 1.5 kg per hectare;
VI + VII: 1.5 + 0.5 kg per hectare.

After 8 to 14 days it was ascertained that the compositions had a better overall action than the individual active ingredients, combined with good crop plant compatibility. The results are given below:

| Active ingredient | I | | | | II | | | | III | | IV | | V | VI | | | VII | | | |
|---|---|---|---|---|---|---|---|---|---|---|---|---|---|---|---|---|---|---|---|---|
| kg/ha | 1.5 | 3 | 2 | 3 | 1 | 3 | 1 | 2 | 0.5 | 2 | 1.5 | 2 | 0.5 | 1 | 1.5 | 2 | 3 |
| Oryza sativa | 10 | 25 | 10 | 20 | — | — | — | — | — | — | — | — | 0 | 0 | 0 | 0 | 0 |
| Soja hispida | 10 | 25 | — | — | 5 | 25 | — | — | — | — | — | — | 0 | 0 | 0 | 5 | 10 |
| Zea mays | — | — | — | — | — | — | 0 | 20 | — | — | — | — | 0 | 0 | 0 | 0 | 0 |
| Triticum aestivum | — | — | — | — | — | — | — | — | 0 | 20 | 10 | 15 | 0 | 0 | 0 | 0 | 0 |
| Echinochloa crus-galli | 65 | 95 | 60 | 90 | 40 | 80 | 40 | 70 | — | — | — | — | 0 | 5 | 5 | 10 | 10 |
| Setaria faberii | 65 | 90 | 60 | 90 | 35 | 70 | 45 | 75 | — | — | — | — | 0 | 5 | 5 | 10 | 15 |
| Cyperus esculentus | 45 | 80 | 30 | 55 | 20 | 55 | 5 | 10 | — | — | — | — | 20 | 36 | 45 | 65 | 90 |
| Xanthium | 30 | 65 | 30 | 45 | 25 | 60 | 30 | 55 | — | — | — | — | 30 | 40 | 60 | 70 | 95 |
| Sinapis arvensis | 60 | 95 | 40 | 60 | 60 | 95 | 45 | 90 | — | — | — | — | 45 | 60 | 75 | 95 | 100 |
| Alisma plantago-aquatica | 30 | 50 | 15 | 30 | 20 | 55 | 20 | 45 | — | — | — | — | 20 | 40 | 60 | 75 | 80 |
| Galium aparine | — | — | — | — | — | — | — | — | 25 | 85 | 60 | 85 | 30 | 40 | 60 | 70 | 80 |
| Matricaria chamomilla | — | — | — | — | — | — | — | — | 30 | 95 | 65 | 90 | 35 | 50 | 60 | 90 | 95 |
| Alopecurus myosuroides | — | — | — | — | — | — | — | — | 50 | 95 | 45 | 80 | 5 | 5 | 15 | 10 | 15 |
| Poa annua | — | — | — | — | — | — | — | — | 55 | 100 | 60 | 95 | 5 | 5 | 5 | 5 | 10 |

0 = no damage
100 = complete destruction

| Active ingredient | I + VII | II + VII | III + VII | IV + VII | V + VII | VI + VII |
|---|---|---|---|---|---|---|
| kg/ha | 2.5 + 1.5 | 2 + 1 | 1 + 2 | 1 + 1 | 0.5 + 1.5 | 1.5 + 0.5 |
| Oryza sativa | 10 | 10 | — | — | — | — |
| Soja hispida | 10 | — | 5 | — | — | — |
| Zea mays | — | — | — | 0 | — | — |
| Triticum aestivum | — | — | — | — | 0 | 10 |
| Echinochloa crus-galli | 90 | 90 | 80 | 70 | — | — |
| Setaria faberii | 90 | 85 | 75 | 75 | — | — |
| Cyperus esculentus | 100 | 95 | 100 | 100 | — | — |
| Xanthium pensylvanicum | 100 | 100 | 100 | 100 | — | — |
| Sinapis arvensis | 100 | 100 | 100 | 100 | — | — |
| Alisma plantago-aquatica | 100 | 90 | 100 | 100 | — | — |
| Galium aparine | — | — | — | — | 100 | 95 |
| Matricaria chamomilla | — | — | — | — | 100 | 95 |
| Alopecurus myosuroides | — | — | — | — | 80 | 75 |
| Poa annua | — | — | — | — | 80 | 80 |

0 = no damage
100 = complete destruction

EXAMPLE 2

In the open the crop plant soybeans (*Soja hispida*) and Indian corn (*Zea mays*) and the unwanted plants barnyard grass (*Echinochloa crus-galli*), giant foxtail (*Setaria faberii*), yellow nutsedge (*Cyperus esculentus*), wild mustard (*Sinapis arvensis*), common cocklebur (*Xanthium pensylvanicum*), catchweed bedstraw (*Galium aparine*), chamomile (*Matricaria chamomilla*), perennial ryegrass (*Lolium perenne*) and bluegrass (*Poa trivialis*) are treated postemergence with the following individual active ingredients and composition thereof:

I  3-isopropyl-2,1,3-benzothiadiazinone-(4)-2,2-dioxide, 0.7 and 2 kg per hectare;

II 3-amino-2,5-dichlorobenzoic acid, 1.3 and 2 kg per hectare;

I + II 0.7 + 1.3 kg per hectare.

After 10 to 14 days it was ascertained that the composition I + II had better crop plant compatibility and a better herbicidal action than its individual components I and II.

The results are given below:

| Active ingredient kg/ha | I 0.7 | 2 | II 1.3 | 2 | I + II 0.7+1.3 |
|---|---|---|---|---|---|
| Soja hispida | 0 | 0 | 0 | 10 | 0 |
| Zea mays | 0 | 0 | 0 | 15 | 0 |
| Echinochloa crus-galli | 10 | 10 | 50 | 80 | 85 |
| Setaria faberri | 15 | 20 | 45 | 80 | 90 |
| Cyperus esculentus | 40 | 75 | 10 | 10 | 90 |
| Sinapis arvensis | 40 | 80 | 20 | 30 | 100 |
| Xanthium pensylvanicum | 50 | 90 | 5 | 10 | 100 |
| Galium aparine | 45 | 80 | 10 | 10 | 85 |
| Matricaria chamomilla | 50 | 80 | 5 | 10 | 95 |
| Lolium perenne | 0 | 0 | 40 | 70 | 70 |
| Poa trivialis | 0 | 0 | 50 | 80 | 90 |

0 = no damage
100 = complete destruction

| Active ingredient | I | II | III | IV | I + IV | II + IV | III + IV |
|---|---|---|---|---|---|---|---|
| kg/ha | 0.4 | 0.3 | 0.5 | 0.5 | 0.4 + 0.5 | 0.3 + 0.5 | 0.5 + 0.5 |
| Triticum aestivum | 5 | 10 | 0 | 0 | 0 | 5 | 0 |
| Hordeum vulgare | 0 | 5 | 0 | 0 | 0 | 0 | 0 |
| Secale cereale | 0 | 5 | 0 | 0 | 0 | 0 | 0 |
| lawn grass | 0 | 0 | 0 | 0 | 0 | 0 | 0 |
| Sinapis arvensis | 30 | 35 | 15 | 25 | 80 | 90 | 70 |
| Galeopsis tetrahit | 25 | 30 | 20 | 25 | 75 | 85 | 75 |
| Galium aparine | 20 | 30 | 15 | 35 | 90 | 100 | 85 |
| Kochia scoparia | 25 | 25 | 15 | 20 | 70 | 80 | 80 |
| Lamium purpureum | 30 | 40 | 25 | 10 | 80 | 90 | 90 |
| Lithospermum officinale | 25 | 30 | 20 | 25 | 75 | 90 | 85 |
| Matricaria chamomilla | 20 | 30 | 20 | 35 | 80 | 100 | 75 |
| Amaranthus retroflexus | 30 | 35 | 25 | 30 | 90 | 100 | 95 |
| Xanthium pensylvanicum | 20 | 25 | 20 | 40 | 85 | 95 | 90 |

0 = no damage
100 = complete destruction

The action of the following compositions corresponds to that of those above:

3-isopropyl-2,1,3-benzothiadiazinone-(4)-2,2-dioxide with
2-methoxy-3,5,6-trichlorobenzoic acid.

I claim:

1. A herbicide composition comprising an inert solid or liquid carrier having dispersed therein a herbicidally effective amount of herbicides consisting essentially of
   a. a compound of the formula

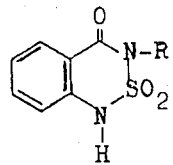

where R denotes lower alkyl of a maximum of 4 carbon atoms, or an alkali metal, lower alkylammonium, lower hydroxyalkyl-ammonium, or lower alkyl lower hydroxyalkyl ammonium salt thereof, and
   b. 2,3,6-trichlorobenzoic acid, 2-methoxy-3,6-dichlorobenzoic acid, 3-amino-2,5-dichlorobenzoic acid, or 2-methoxy-3,5,6-trichlorobenzoic acid in a weight ratio of $a$ to $b$ in the range of 3:1 to 1:3.

2. A herbicide composition as claimed in claim 1 wherein compound (b) is 3-amino-2,5-dichlorobenzoic acid.

3. A herbicide composition as claimed in claim 2 wherein compound (a) is 3-isopropyl-2,1,3-benzothiadiazinone-(4)-2,2-dioxide.

4. A herbicide composition as claimed in claim 1 wherein compound (b) is 2,3,6-trichlorobenzoic acid.

5. A herbicide composition as claimed in claim 1 wherein compound (b) is 2-methoxy-3,6-dichlorobenzoic acid or 2-methoxy-3,5,6-trichlorobenzoic acid.

* * * * *